UNITED STATES PATENT OFFICE.

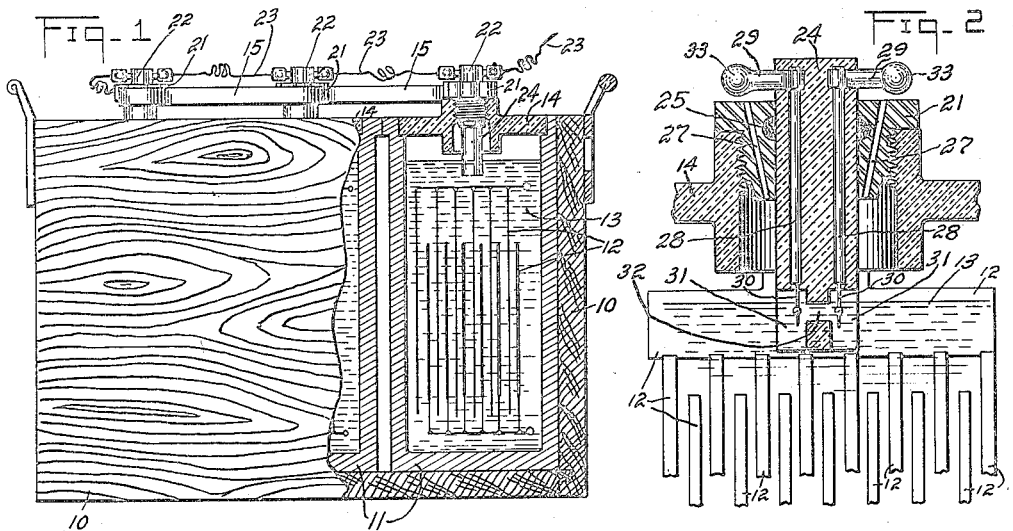
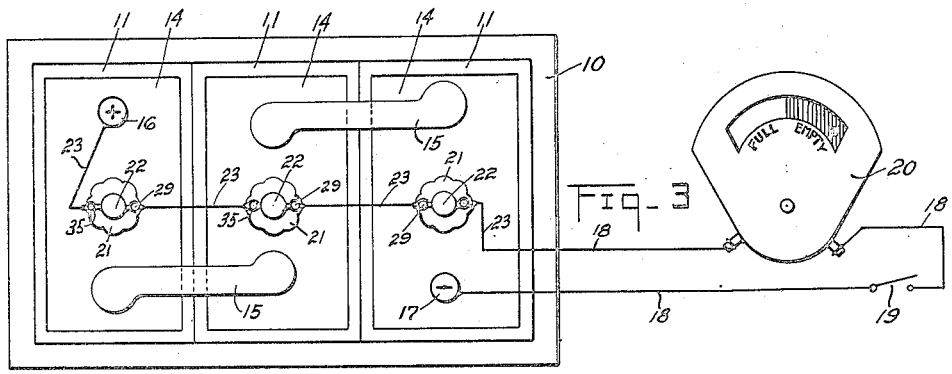
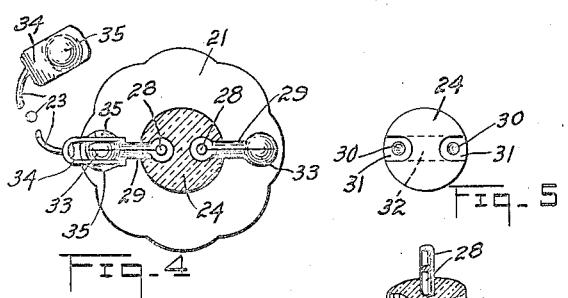
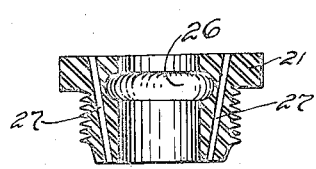
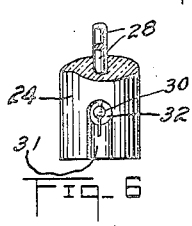

REGINALD W. MILLARD, OF MERIDEN, CONNECTICUT, AND MAURICE A. MICHAELS, OF CAMBRIDGE, MASSACHUSETTS, ASSIGNORS TO FOSTER, MERRIAM & COMPANY, A CORPORATION OF CONNECTICUT.

ELECTROLYTE INDICATOR FOR STORAGE BATTERIES.

1,414,745.            Specification of Letters Patent.       Patented May 2, 1922.

Application filed June 17, 1919. Serial No. 304,837.

*To all whom it may concern:*

Be it known that we, (1) REGINALD W. MILLARD and (2) MAURICE A. MICHAELS, ciitzens of the United States, residing at (1) 835 Broad Street, Meriden, (2) "Tech" Dorms, Cambridge, (1) county of New Haven, State of Connecticut, (2) county of Middlesex, State of Massachusetts, have invented an Improvement in Electrolyte Indicators for Storage Batteries, of which the following is a specification.

This invention relates to means for indicating the level of the liquid electrolyte in electrolytic apparatus, and especially, although not exclusively, to a liquid level indicator for storage batteries.

In the use of storage batteries and other electrolytic apparatus, it is desirable, for purposes of efficiency and economy, that the quantity of liquid electrolyte be maintained within certain limits, and particularly above a predetermined minimum, for the reason that a low level of the electrolyte causes the electrode plates to disintegrate rapidly, due to the fact that, in evaporation, the density of the electrolyte is considerably changed, and for the further reason that any considerable change in density, whether in the nature of an increase or a decrease, seriously affects the output of the battery. The present invention, accordingly, has for its object to provide means by which it may be readily determined whether or not the cell or cells of a storage battery or other electrolytic apparatus contain a sufficient quantity of liquid, without the necessity of opening the cells and making a visual examination.

The foregoing and other objects of the invention, together with means whereby the same may be carried into effect, will best be understood from the following description of one form or embodiment thereof illustrated in the accompanying drawings, in which:

Figure 1 is a side elevation, partly broken away, of a storage battery having the invention applied thereto;

Figure 2 is an enlarged vertical section of one of the contact devices, and certain parts associated therewith;

Figure 3 is a diagrammatic view, showing the battery in plan, of the complete apparatus;

Figure 4 is a detail plan view, partly in section, of the connector terminals of the contact device and their cooperating connector clips;

Figure 5 is a plan view, and Figure 6 a detail elevation, of the lower end of one of the contact devices, showing a pair of contact members or terminals and the lower end of the rod or plug by which they are carried; and Figure 7 is a detail vertical section of the bushing for supporting a contact carrying plug.

The invention is herein shown as applied to a storage battery comprising a casing 10 containing a plurality of cells 11 each of which in turn contains a pair of electrode plates 12 and a quantity of liquid electrolyte 13, said cells being closed at the top by the usual cover plates 14, and the electrodes of the several cells being connected in series by suitable conductors 15, the positive and negative electrodes of the end-most cells being connected to positive and negative terminals 16 and 17 respectively. The particular construction and arrangement of the storage battery forms no portion of the present invention, and the details thereof may be of any usual or well-known type.

In accordance with the invention, there is employed a signalling or indicating circuit which may receive its energy from any suitable source, but which is preferably connected with the terminals 16 and 17 of the battery. Said circuit includes suitable electrically operated signalling or indicating means, and also includes, as parts thereof connected in series therein, the fluid in each cell above a predetermined level, whereby when the liquid in any cell falls below the level in question said circuit will be broken.

To this end each of the cells 11 is provided with a contact device 22 having a pair of contact members or terminals dipping into the electrolyte in the corresponding cell, said contact devices being connected in series by conductors 23, and the series being included in a circuit 18 from the battery terminals 16 and 17, said circuit also including a manually operated circuit closer or switch 19 and a signalling or indicating device. Said indicating device may be of any suitable character, such as a lamp or bell adapted to give a visible or an audible signal upon the passage of a current of electricity there-through, and the precise form thereof is immaterial and is capable of wide variation, the same being herein illustrated as in the form of an electromagnetically operated indicator 20.

As most clearly shown in Figure 2, each of the contact devices comprises a threaded bushing 21 seated in a threaded opening in the cell cover 14 and in which is slidably mounted a rod or plug 24, said rod or plug being held in adjusted vertical position in the bushing 21 by means of a resilient ring 25, preferably of soft rubber, seated in a suitable annular groove 26 in the bushing 21 and engaging said rod or plug. The bushing 21 is preferably formed with one or more vent openings 27 to permit the escape of gases from the cell. The rod or plug 24 is preferably composed of suitable insulating material of a plastic nature in which are molded a pair of conductors or leads 28 having at their upper ends connector terminals 29 and at their lower ends tips or contact members 30 composed of some conducting material not affected by the electrolyte, preferably platinum. In order to protect the contact terminals 30, said terminals are preferably housed in recesses 31 formed in the sides of the plug 24 adjacent the lower end of the latter, said recesses being connected by a passage 32 in said plug permitting the passage of fluid between said tips. The plug 24 is adjusted in the bushing 21 to a vertical position wherein the lower ends of the terminals 30 are immersed in the liquid electrolyte to the level below which the level of said electrolyte should not be permitted to fall.

The connector terminals 29 preferably comprise strips of sheet metal which are folded about the conductors 28 within the material of the plug 24, the free extending ends of said strips being brought into engagement with each other and being bent into substantially hemispherical form so as collectively to constitute substantially spherical connector knobs 33. Said knobs 33 are engaged by connector clips 34 comprising U-shaped pieces of resilient sheet metal, the arms of which are formed with oppositely disposed depressions 35 adapted to seat the knobs 33, and the intermediate portions of which are electrically connected with the conductors 23.

In operation, when it is desired to determine whether or not the liquid level of the electrolyte in all of the cells is above the required minimum, the switch 19 is closed, whereupon, if all of the terminals 30 are immersed in the liquid in their respective cells, current will pass through the circuit 18, causing the indicating device 20 to be energized and display or sound its predetermined signal. The circuit is from positive battery terminal 16, over wires 23 through contact members 22 and the portion of the electrolyte in each cell between the terminals 30, over wires 18 through indicator 20, to the negative battery terminal 17, when circuit closer 19 is closed and the electrolyte in each cell is at a level to immerse the terminals 30. If, however, the surface of the electrolyte 13 in any cell has fallen below the level of the corresponding terminals 30, the circuit will be broken at that point, and, as the contact devices 22 are connected in series, no current will pass through the circuit 18, and the indicator 20 will remain inactive. It will be seen that the activity or non-activity of the indicator 20 upon the closure of the switch 19 at once informs the operator whether or not the liquid level of the electrolyte in all of the cells is at or above the required level. Failure of the indicator 20 to respond to the closure of the switch 19 will indicate that the liquid level in at least one of the cells has fallen below the required point, whereupon, by successively short circuiting the terminals 29 of the several contact devices 22 in any suitable manner, it may be determined which of said cells requires attention.

Having thus described our invention, we claim:

1. A liquid level indicator for multiple cell electrolytic apparatus comprising electrolyte engaging contact members associated with each cell, an electric circuit including as portions thereof said members and portions of the electrolyte above a predetermined level in the several cells, said contact members being connected in series, and said circuit also including electrically operated indicating means.

2. An apparatus of the character described comprising a plurality of electrolytic cells each containing a liquid electrolyte, a contact device for each of said cells, each of said contact devices comprising a pair of contact members immersed to a predetermined level in the electrolyte of the corresponding cell, and an electric circuit in which said contact devices are connected in series, said circuit including electrically operated indicating means.

In testimony whereof we affix our signatures.

REGINALD W. MILLARD.
MAURICE A. MICHAELS.